(12) United States Patent (10) Patent No.: US 12,612,978 B2

Featherstone (45) Date of Patent: Apr. 28, 2026

(54) DIFFERENTIAL PRESSURE REGULATOR

(71) Applicant: Wanner Engineering, Inc., Minneapolis, MN (US)

(72) Inventor: Dustin Featherstone, Hastings, MN (US)

(73) Assignee: WARNER ENGINEERING, INC., Minneapolis, MN (US)

( * ) Notice: Subject to any disclaimer, the term of this patent is extended or adjusted under 35 U.S.C. 154(b) by 0 days.

(21) Appl. No.: 18/397,596

(22) Filed: Dec. 27, 2023

(65) Prior Publication Data

US 2024/0209956 A1 Jun. 27, 2024

Related U.S. Application Data

(60) Provisional application No. 63/477,343, filed on Dec. 27, 2022.

(51) Int. Cl.
*F16K 31/126* (2006.01)
*F04B 43/06* (2006.01)

(52) U.S. Cl.
CPC .......... *F16K 31/1262* (2013.01); *F04B 43/06* (2013.01)

(58) Field of Classification Search
CPC ................. F16K 31/1262; F04B 43/06; Y10T 137/7809; Y10T 137/781; Y10T 137/7812; Y10T 137/782; Y10T 137/7836
USPC .......................................... 251/359; 210/637
See application file for complete search history.

(56) References Cited

U.S. PATENT DOCUMENTS

| | | | | |
|---|---|---|---|---|
| 1,646,640 | A | * 10/1927 | Daniel .................. | F16K 31/363 |
| | | | | 137/484.8 |
| 1,885,000 | A | * 10/1932 | Muller .................. | F16K 17/085 |
| | | | | 251/86 |
| 2,329,323 | A | * 9/1943 | Benz ........................ | F17C 13/04 |
| | | | | 137/487 |
| 4,197,877 | A | 4/1980 | Winiasz | |
| 6,071,089 | A | * 6/2000 | Maier .................... | F02M 59/14 |
| | | | | 417/388 |
| 9,081,390 | B2 | * 7/2015 | Andersson ........... | G05D 16/024 |
| 10,353,409 | B2 | 7/2019 | McComb et al. | |

(Continued)

FOREIGN PATENT DOCUMENTS

| | | |
|---|---|---|
| CN | 105179769 A | 12/2015 |
| CN | 114673818 B | 12/2022 |

OTHER PUBLICATIONS

Sentinel™ Back Pressure Valves and Pressure Relief Valves; Blacoh Industries, Web page https://www.blacoh.com/sentinel-backpressure.aspx, printed Jan. 29, 2024, six pages.

(Continued)

*Primary Examiner* — Jessica Cahill

(74) *Attorney, Agent, or Firm* — Merchant & Gould P.C.

(57) ABSTRACT

A regulator valve includes a valve body defining a central bore with a longitudinal axis. A rod couples to a diaphragm and slides along the longitudinal axis within the central bore. The rod has a planar end. A spring, such as a helical spring, mounts in the central bore and engaging the rod. One or more parallel passages are formed in the valve body extend parallel to the bore. One or more slots are formed in the valve body, each of the one or more slots connecting one of the one or more parallel passages to the central bore. The regulator valve may be used in a pumping system as a pressure regulator.

17 Claims, 9 Drawing Sheets

(56)         References Cited

U.S. PATENT DOCUMENTS

| | | | |
|---|---|---|---|
| 11,194,352 B2 | 12/2021 | McComb et al. | |
| 2004/0228748 A1* | 11/2004 | Lehrke .................. | F04B 43/073 |
| | | | 417/440 |
| 2008/0011577 A1* | 1/2008 | Burkhart ................ | F16D 48/04 |
| | | | 192/85.59 |
| 2008/0029171 A1* | 2/2008 | Weyer ................ | F16K 31/1262 |
| | | | 137/625.33 |
| 2018/0306179 A1 | 10/2018 | Hembree | |
| 2018/0372083 A1 | 12/2018 | Hembree | |
| 2019/0332130 A1 | 10/2019 | Mccomb et al. | |
| 2020/0326733 A1* | 10/2020 | Morgan .................. | F17C 13/04 |

OTHER PUBLICATIONS

International Search Report and Written Opinion for International
Patent Application No. PCT/US2023/086057 mailed Mar. 22, 2024.

* cited by examiner

FIG. 12

DIFFERENTIAL PRESSURE REGULATOR

BACKGROUND OF THE INVENTION

Field of the Invention

The present invention is related to a pressure regulator, and in particular to a pressure regulator valve for maintaining a proper amount of hydraulic fluid in a fluid system.

Description of the Prior Art

Conventional pressure regulators for fluid systems, such as hydraulic fluid systems, are designed to establish a control pressure that is close to the pressure set point with as little variation as possible. This is frequently accomplished with a poppet style valve that requires relatively small movement to go from a fully closed position to a high flow position. Such poppet valves can range is size and are utilized in a wide range of applications. Such poppet style valves are often preferred if complete shut-off of the fluid is required. However, when the regulated flow is small, vibration can result as the valve rapidly closes and opens with very small movement. For some applications, such as regulating a hydraulic oil supply to a hydraulically driven diaphragm pump, a small range of pressure variation is acceptable, and complete shut-off is not required, therefore a more stable method of valve opening can be utilized.

Pressure regulator valves are also used for higher flows such as pumping slurries. In such a use, the fluid feeding a large diaphragm pump has a high content of solids. This type of fluid tends to precipitate the solids in stagnant areas that become a solid mass. When this mass opposes the movement of a component in a pump it is often called packing out. Conventional poppet style valves may suffer from packing out. To avoid this from happening in a valve or pressure gauge, an isolation fluid is sometimes used. This is a zone in the connection between the inlet slurry and the valve that is filled with a fluid like oil. The oil is separated from the slurry with a diaphragm or piston. This is a complicated arrangement that requires significant effort to fill and maintain. There is therefore a benefit if the valve does not require isolation from the slurry.

It can therefore be appreciated that an improved pressure regulator valve is needed to maintain hydraulic fluid pressure. Such a regulator should create a variable size flow passage depending on position of a sliding rod. Such a regulator should achieve a range of operating pressure that achieves a highly stable valve with minimal vibrations, where the position of the spool can reach equilibrium in a range of positions. Such a valve should operate even with fluids having a high percentage of solids. Such a valve therefore should avoid the packing out and the related problems. The present invention addresses these problems, as well as others, associated with fluid pressure regulators.

SUMMARY OF THE INVENTION

The present invention is directed to a pressure bypass regulator valve. The regulator valve may be used in a pumping system such as a slurry pumping system. The regulator valve has a valve body defining a central bore with a longitudinal axis. A diaphragm is coupled to a rod sliding along the longitudinal axis within the central bore. The rod is cylindrical with a planar end. A helical spring mounts in the central bore and engages the rod. The spring is sized with a spring constant that corresponds to a desired full flow range and with the allowable pressure. In one embodiment, parallel passages are formed in the valve body extending parallel to the bore. Each passage has an associated bridging slot connecting a corresponding parallel passage to the central bore. The valve body forms a shoulder in the central bore that is engaged by the coils at an end of the spring.

In one embodiment, the slots are tapered. The tapered slots vary the flow rate as the cylindrical rod moves longitudinally and exposes the slots with varying cross-section to the central bore and increase the rate of change of the fluid flow. In a further embodiment, multiple slots are provided with different lengths. As the cylindrical rod moves longitudinally along the central bore, more slots are exposed and the flow rate through the slots and passages increases from the increased cross sectional area. The flow rate slows at an increased rate as the cylindrical rod moves along the central bore to cover the taped slots or the slots of different lengths.

The pressure regulator valve is used as a pressure bypass regulator valve in a pressure regulation system. An example application is for a pumping system for pumping slurries. Such a system may include a hydraulically driven diaphragm pump. In such a system, the pressure bypass regulator valve maintains pressure from an oil pump and in a hydraulic oil line by dumping excess flow to a discharge port. The diaphragm pump is pressure fed by a feed pump through a feed line.

These features of novelty and various other advantages that characterize the invention are pointed out with particularity in the claims annexed hereto and forming a part hereof. However, for a better understanding of the invention, its advantages, and the objects obtained by its use, reference should be made to the drawings that form a further part hereof, and to the accompanying descriptive matter, in which there is illustrated and described a preferred embodiment of the invention.

BRIEF DESCRIPTION OF THE DRAWINGS

Referring now to the drawings, wherein like reference numerals and letters indicate corresponding structure throughout the several views:

FIG. 12 is a graph of flow versus rod position for a regulator valve as shown in FIG. 1 in a typical application.

DETAILED DESCRIPTION OF THE PREFERRED EMBODIMENT

Figure 1:
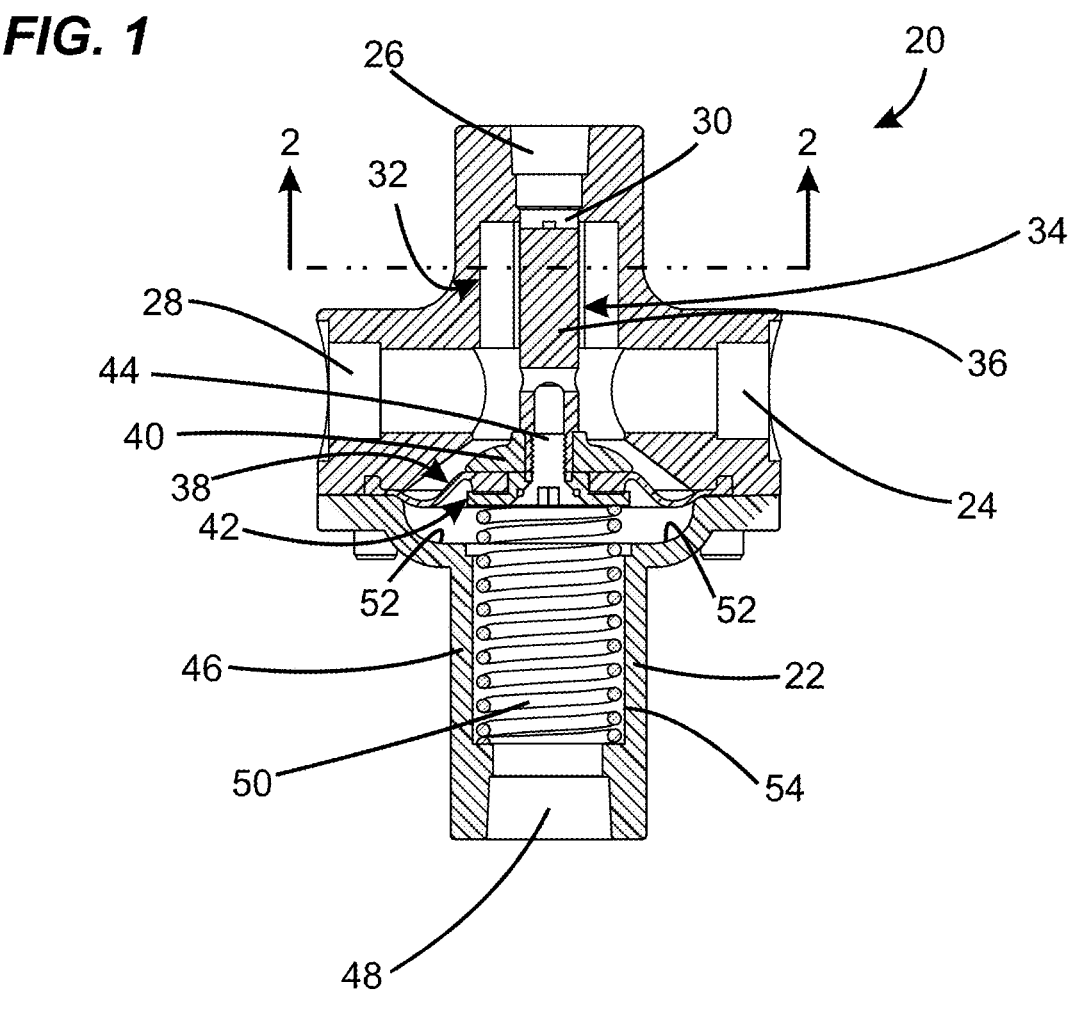
FIG. 1 is a side sectional view of a regulator according to the present invention at a mid-stroke position.
Figure 2:
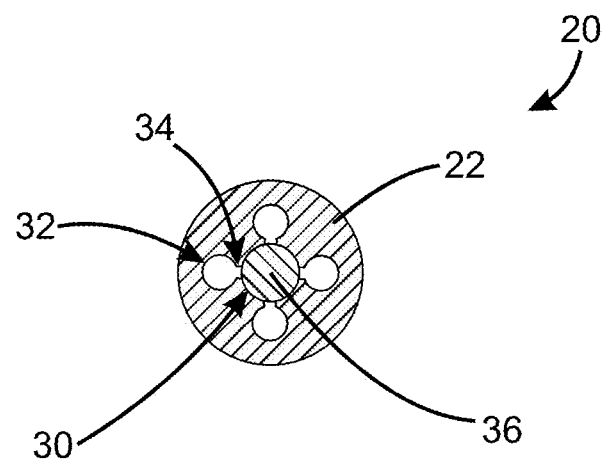
FIG. 2 is a cross sectional view of the valve body for the regulator valve taken along line 2-2 of FIG. 1.
Figure 5:
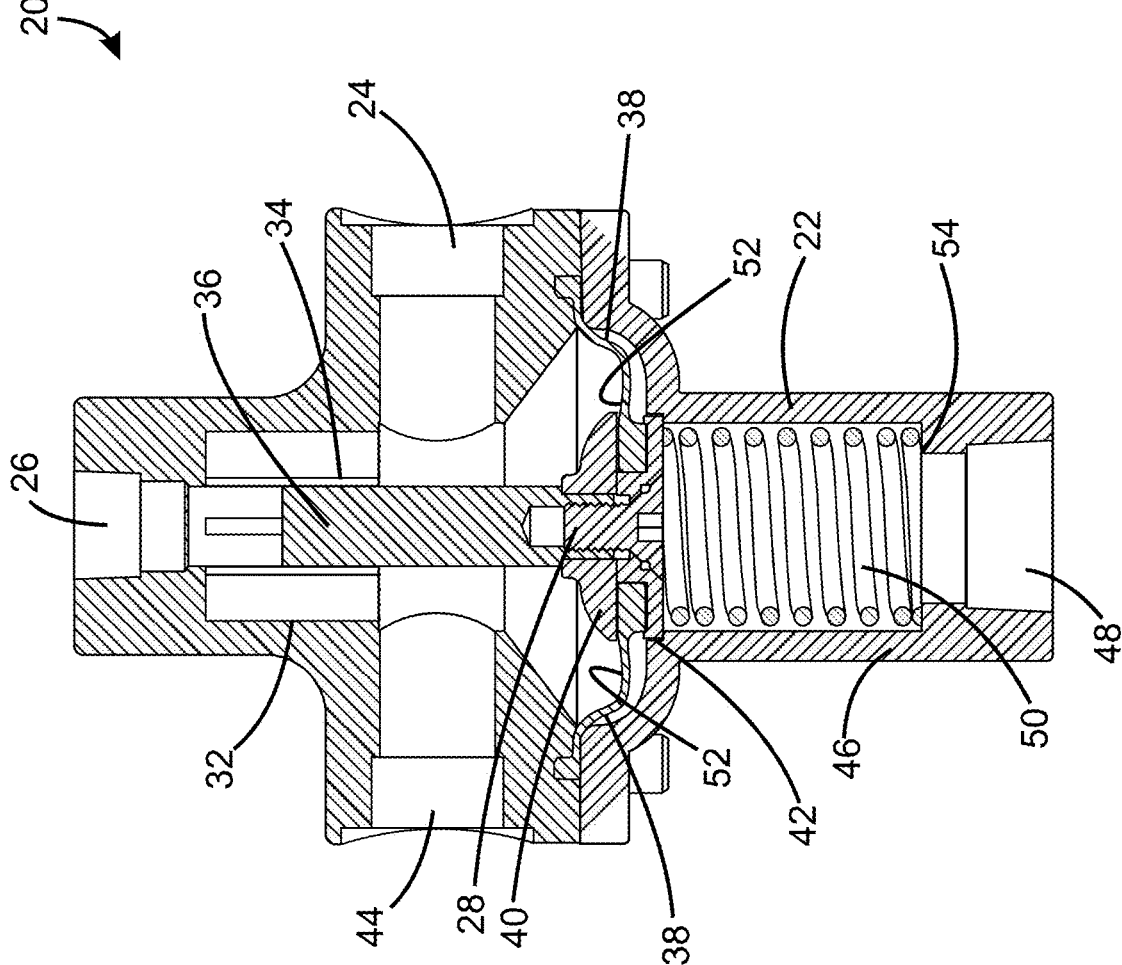
FIG. 5 is a side sectional view of the regulator valve shown in FIG. 1 in the fully open position.

Referring to FIGS. 1, 2, 4, and 5, a regulator 20 has a valve body 22, which includes an inlet port 24, and a discharge or outlet port 26. In the embodiment shown, a third auxiliary port 28 is provided that is in the same bore as the inlet port 24. It can be utilized as an outlet port if desired to eliminate the need for a Tee in the inlet line in some applications. Alternately, auxiliary port 28 can be used for a pressure gauge or other devices for monitoring the controlled fluid. Valve body 22 has a central bore 30 which is connected to the outlet port 26. One or more passages 32 are parallel to the central bore 30 and fluidly connected to the central bore 30 with slots 34. As shown in FIG. 2, each of the slots 34 is narrower than an associated passage and forms a connecting neck or channel between the central bore 30 and the associated parallel passage 32. A cylindrical rod 36 is positioned in the central bore 30 and can slide axially along the central bore 30. The cylindrical rod 36 has a planar end transverse to the longitudinal axis of the central bore 30. The rod 36 is attached to a diaphragm 38 with a lower clamp 40 and upper clamp 42 and a screw fastener 44. The valve body 22 forms a diaphragm support surface 52. As shown in FIG. 5, the diaphragm support surface 52 provides a continuous support without sharp edges or corners that might tear the diaphragm 38. The diaphragm support surface 52 also prevents the diaphragm 38 from being stretched too far. The diaphragm 38 is clamped in place by an upper housing 46. The upper housing 46 includes a control pressure port 48.

A spring 50, such as a helical spring, is held in place by the upper housing 46 and is in contact with the upper clamp 42 of the diaphragm assembly. A shoulder 54 is formed in the central bore 30. The shoulder 54 is configured to receive an end of the helical spring 50 so that the coils of the spring 50 are proximate the wall of the central bore 30. Therefore, solids that may tend to pack out, as explained hereinbelow, are not trapped between the spring 50 and the wall of the central bore 30.

The slots 34 can be sized to allow the maximum flow of the supply being regulated. It is possible to make these slots tapered to allow higher and higher flow as the rod 36 moves to open more of the slots. Alternately when multiple slots are used, each slot can have a different length so that at low discharge flows only one slot is exposed, and as the rod 36 retracts more and more slots are exposed.

Figure 3:
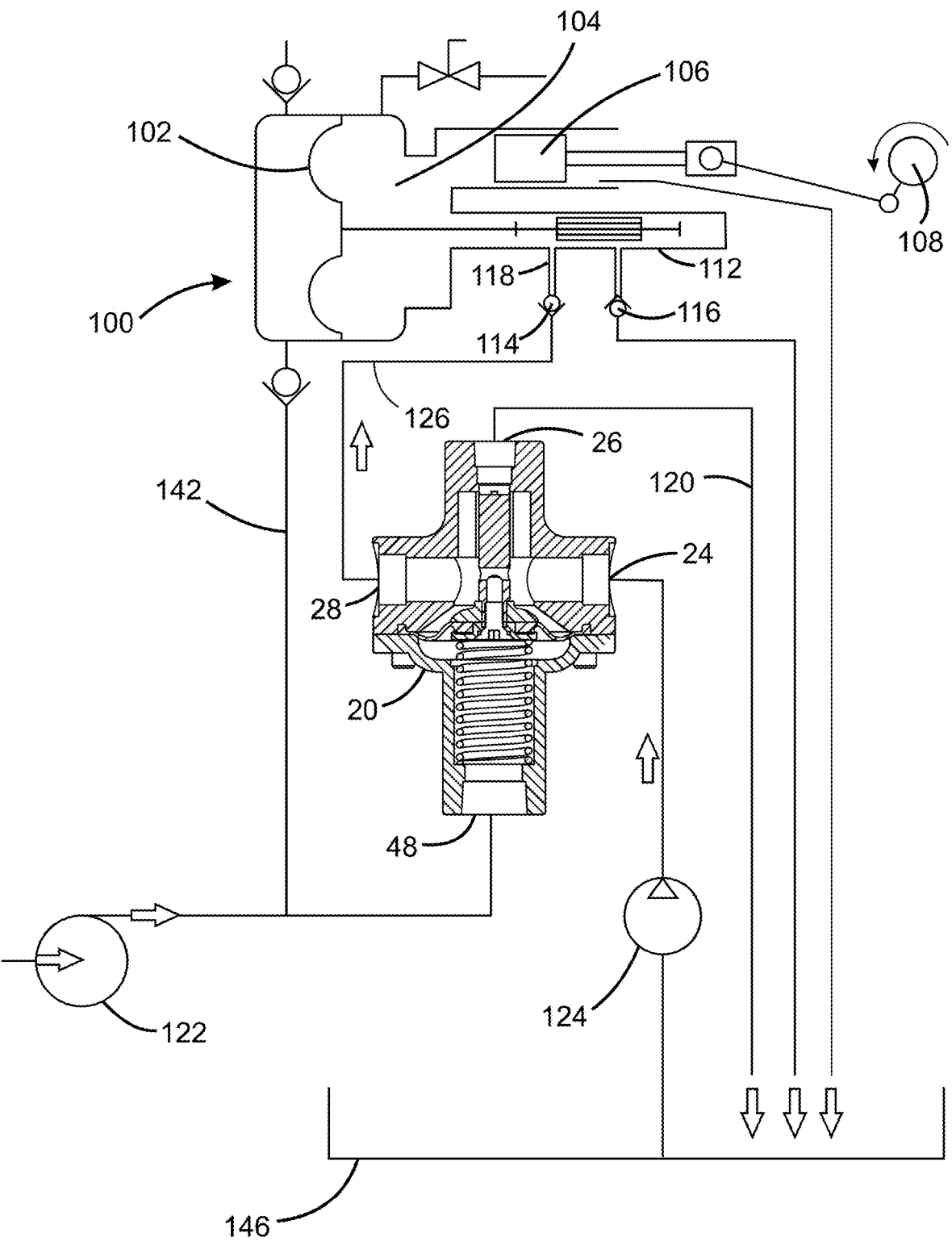
FIG. 3 is a diagrammatic view of a typical application for the regulator shown in FIG. 1.
Figure 4:
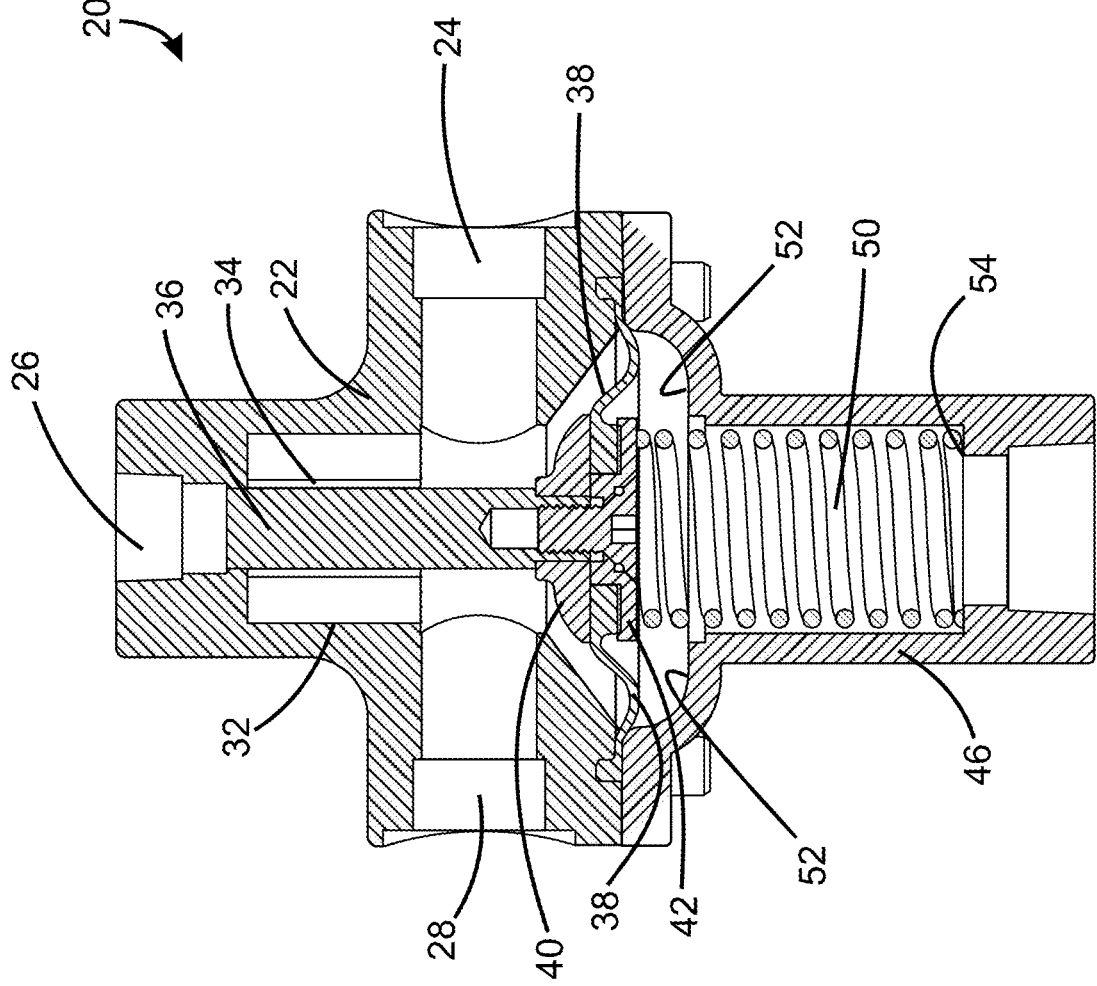
FIG. 4 is a side sectional view of the regulator valve shown in FIG. 1 in the closed position.

Referring to FIG. 3, there is shown a pumping system 200 according to the present invention that utilizes three pumps and a control system with a diaphragm pump 100. The hydraulically driven diaphragm pump 100 is shown having a single cylinder, but the present invention is also applicable to a multiple-cylinder pump assembly, in which all cylinders are fed by a common connection to the oil pressure line. The regulator 20 controls the oil pressure and the hydraulic fluid supply to the diaphragm pump 100. The regulator 20 maintains the pressure from oil pump 124 and in hydraulic oil line 126 by dumping excess flow to the discharge port 26. The diaphragm pump 100 is pressure fed by a feed pump 122 through feed line 142. The hydraulic oil pump 124 draws hydraulic fluid from an oil reservoir/sump 146 and feeds the hydraulic fluid to the inlet port 24 of the regulator 20. The auxiliary port 28 of the regulator 20 is connected to the hydraulic oil inlet for the diaphragm pump 100 by line 126.

A return line 120 is connected to the outlet port 26 of the regulator 20 for returning fluid to the reservoir 146. The pressure port 48 of the regulator 20 is connected to the diaphragm pump feed line 142. The inlet of the diaphragm pump 100 is connected by line 142 to the feed pump 122, which provides boost pressure for the diaphragm pump 100. The oil pump 124 supplies the hydraulic fluid to the diaphragm pump 100. The pumped fluid is the fluid that both the feed pump 122 and diaphragm pump 100 are pumping. The oil pump 124 is a separate fluid system and supplies hydraulic fluid to the diaphragm pump 100.

In the pumping system 200, the diaphragm pump 100 has a diaphragm 102 driven by hydraulic fluid/oil in a transfer chamber 104. The hydraulic fluid is moved by a plunger or piston 106 that is driven by a crankshaft 108. That displacement of the piston 106 is transferred by the hydraulic fluid to cause displacement of the diaphragm 102. A supply of oil is contained in the oil sump 146 as a fluid reservoir, which is usually the crankcase of the pump 100, but may be a separate supply of oil than that used to lubricate the crankshaft bearings and other moving parts of the diaphragm pump 100. The oil sump 146 is normally at atmospheric pressure. The diaphragm pump 100 has a valve spool 112 and two check valves 114, 116 controlling hydraulic oil flow. The first check valve 114, commonly referred to as an underfill valve, provides oil to the transfer chamber 104 when the chamber is under-filled. The second check valve 116 functions as an overfill valve, allowing oil out of the transfer chamber 104 when it is over-filled. During normal operation, there may be leakage past the piston 106 that causes the transfer chamber 104 to be under-filled. An underfilled condition causes the diaphragm 102 to move farther back on the suction stroke and moves the valve spool 112 to uncover the port of underfill line 118 allowing oil to be drawn from the sump 146. This happens during the suction stroke of the diaphragm pump 100, and the underfill valve 114 prevents oil from leaving the transfer chamber 104 during the pressure stroke. The overfill valve 116 when uncovered by the valve spool 112, allows excess oil to be drained from the transfer chamber 104 through the return line 120 to the sump 146.

Figure 7:
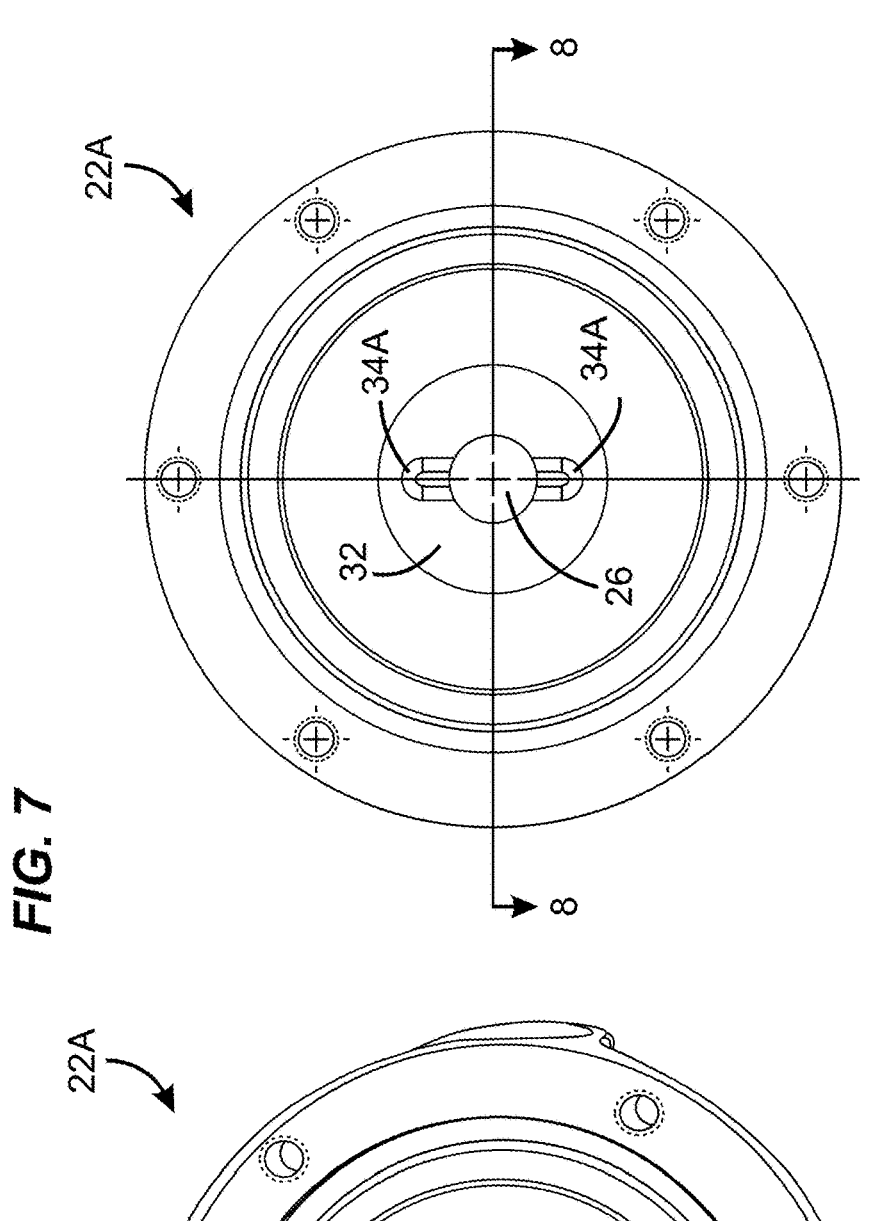
FIG. 7 is an end view of the regulator valve shown in FIG. 6.
Figure 6:
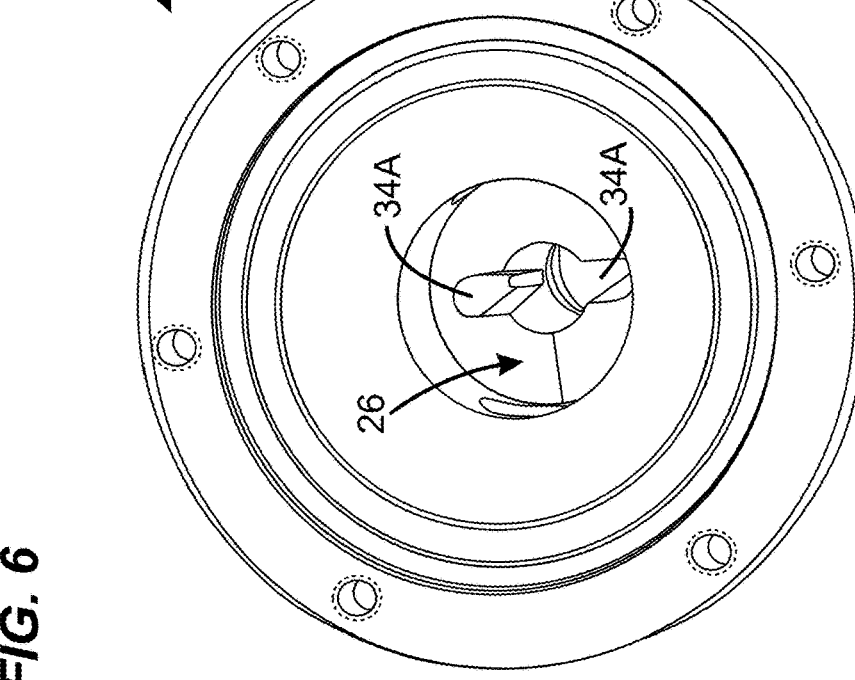
FIG. 6 is a perspective view of an embodiment of the regulator valve according to the principles of the present invention including two tapered slots in the valve body.
Figure 8:
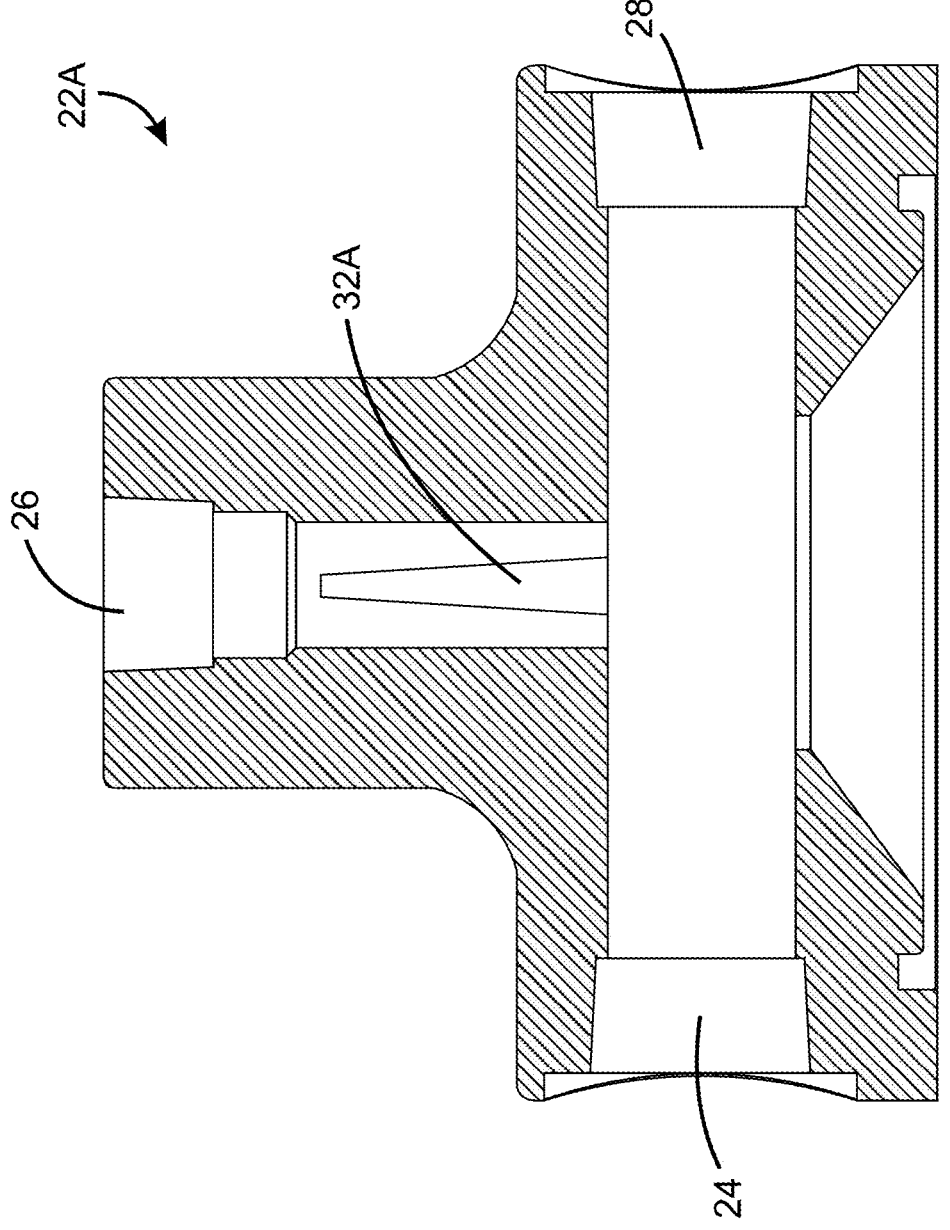
FIG. 8 is a cross sectional view of the valve body for the regulator valve taken along line 8-8 of FIG. 7.

The range of pressures and flow rate capacity can be established in several ways. The overall size of the regulator valve 20 can be configured to accommodate the maximum flow. Moreover, for a given valve size, the number of passages 32 and slots 34 can be increased to accommodate more bypass. Referring now to FIGS. 6-11, in alternate embodiments of the regulator, the valve body may have variable flow passages. As shown in FIGS. 6-8, slots 32A are tapered. The tapered configuration achieves a high bypass flow when fully open. However, the tapered slots 32A also have a reduced opening that accommodates a reduced flow the near closed position. Opposite ends of the slots 32A have different areas and tapered side portions that provide a gradually changing cross sectional area for fluid flow between a fully open and fully closed position and avoids drastic flow changes. As the rod 36 extends and retracts, cross-section area of the central bore 30, slots 32A and passages 34 increases and decreases gradually to accommodate the increasing and decreasing fluid flow.

Figures 9, 10:
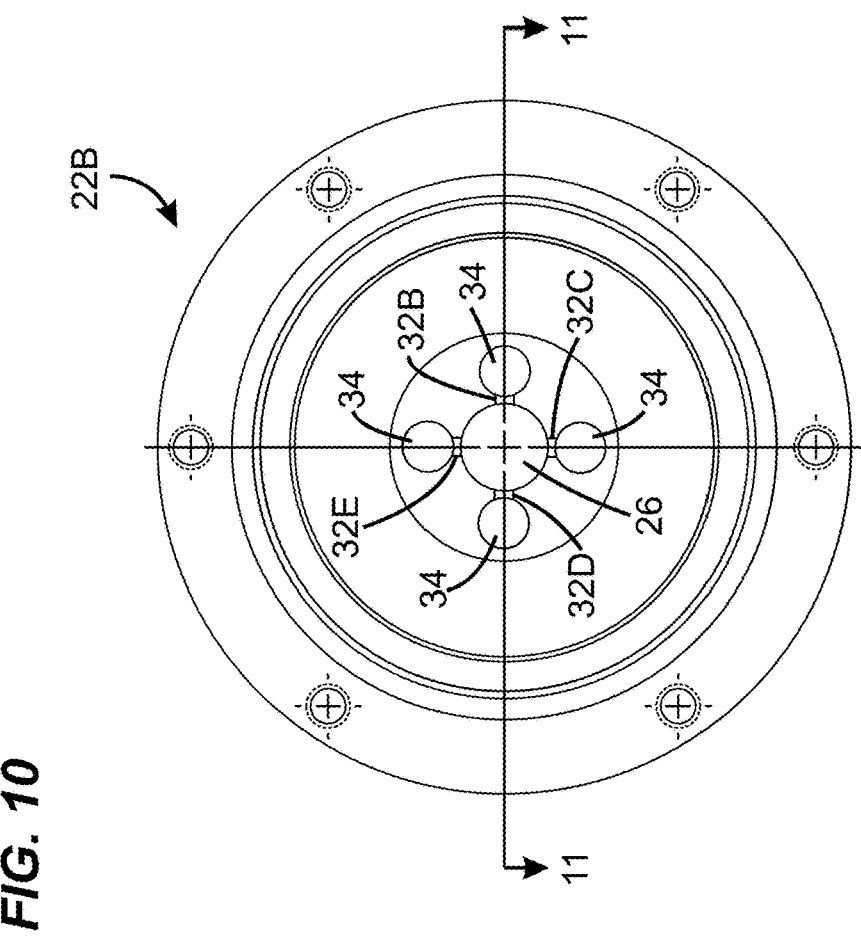
FIG. 9 is a perspective view of an embodiment of the regulator valve according to the principles of the present invention including four slots having different lengths.
FIG. 10 is an end view of the regulator valve shown in FIG. 9.
Figure 11:
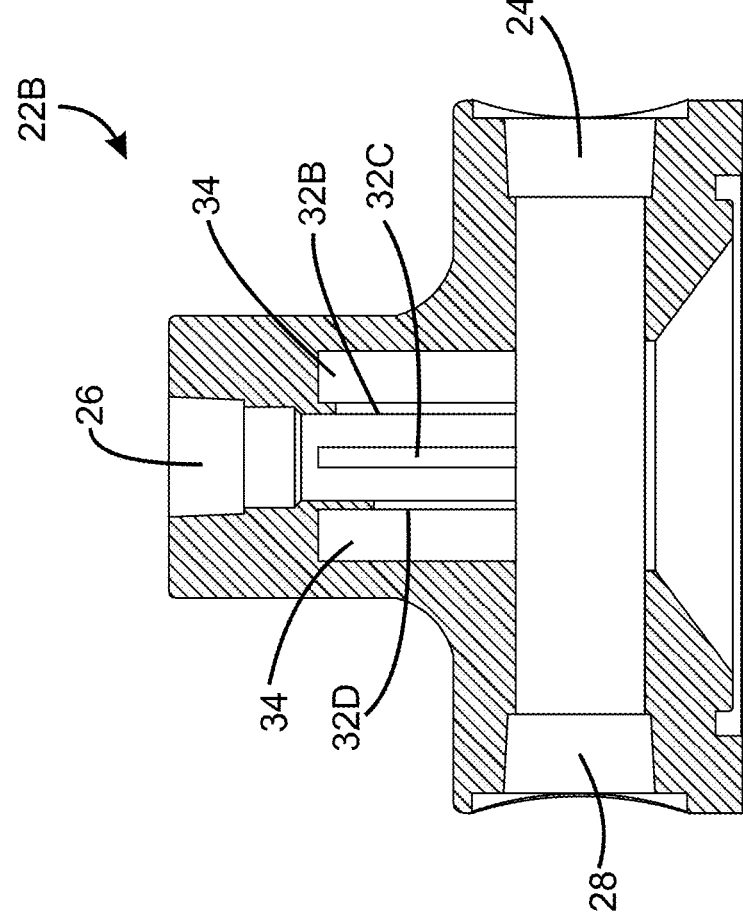
FIG. 11 is a cross sectional view of the valve body for the regulator valve taken along line 11-11 of FIG. 10.

Referring to FIG. 9-11, variable flow rate response can also be accomplished with multiple slots 32B-32E of varying length. In this configuration, the regulator valve body 22B has four parallel passages 34 and four slots 32B, 32C, 32D and 32E, each slot connecting the central bore and a corresponding parallel passage 34. As each of the slots 32B, 32C, 32D and 32E has a different length, the slots are opened and closed to flow at different times as the rod 36 moves axially along the central bore 30. As the rod retracts only a single slot would be exposed, and as the valve opens further and the rod 36 moves, more and more slots are additionally exposed until all four slots 32B, 32C, 32D and 32E are exposed. It is appreciated that although four slots 32B, 32C, 32D and 32E and corresponding parallel passages 34 are shown, in can be appreciated that fewer or more slots and corresponding parallel passages may also be utilized to accommodate a particular application.

Figure 12:
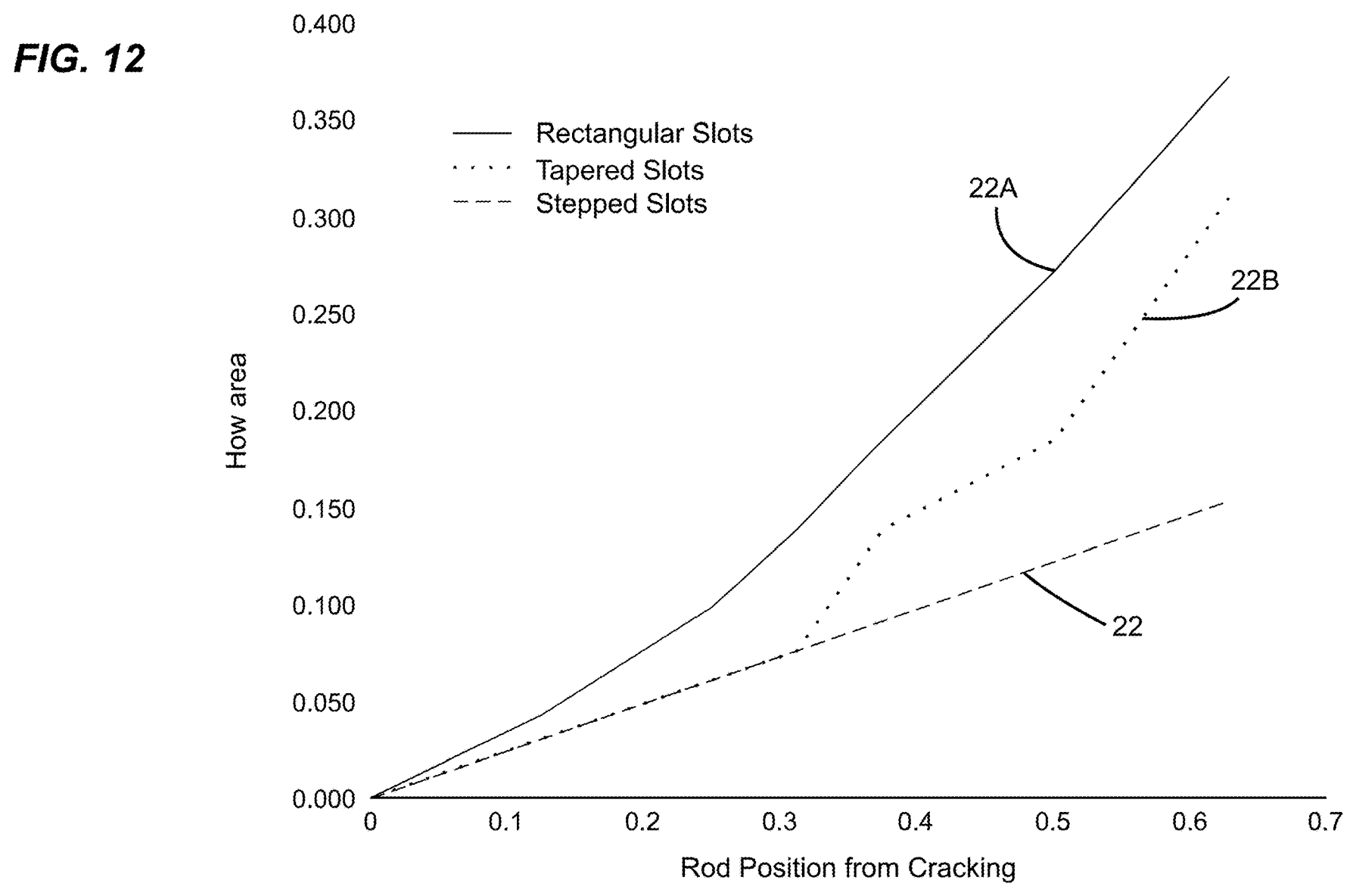

Referring to FIG. 12, the response is shown associated with the various embodiments of the valve bodies, 22, 22A and 22B. It is appreciated that with straight rectangular slots as shown in FIGS. 1, 2, 4 and 5, the flow area increases at a constantly increasing rate. It is appreciated that for a similar size valve body 22A, the cross-sectional flow area increases, but at an increased rate due to the tapered slot configuration. For a similar size valve body 22B, the cross-sectional flow area increases at differing rates as each of the slots 32B, 32C, 32D and 32E is exposed. Therefore, there is a first increasing rate equal to the valve having straight slots 32. However, as the additional slots 32C, 32D and 32E are exposed the rate of exposure changes at a greater rate, represented by a steeper graph line.

Example

The regulator 20 is particularly suited for use as a bypass regulator, such as shown in FIG. 3. In operation, the oil pump 124 provide a fixed fluid flowrate. In a conventional pumping application, such a flowrate is about 3 gallons per minute (gpm). The diaphragm pump 100 that receives the oil may demand the full 3 gpm when first being primed. In this configuration, the regulator valve 20 is "fully closed", with all the slots 34 covered, so that no oil is bypassed back to the reservoir/sump 146. The regulator valve 20 in this condition is preferably sized so the pressure regulated flow is determined by the restrictions in the diaphragm pump oil control system 200. The regulator 20 will stay closed unless that pressure goes above a predetermined level, such as 10 psi, then the regulator 20 will start exposing slots 34 to limit the increase in pressure.

The "cracking pressure" corresponds to the position where the rod 36 is on the verge of exposing a slot. In the example system 200, the cracking pressure may be 10 psi. When the diaphragm pump 100 is operating at low pressure or when not running, the demand for oil is small or none. In this configuration, the valve 20 is "fully open" so that all of the 3 gpm from the oil pump 124 is bypassed to the reservoir 146. When this state is reached, case the maximum slot opening is achieved. The spring is fully compressed, and the spring rate is such that the controlled pressure in now about 15 psi.

In operation, the diaphragm pump 100 would have a typical feed pressure from line 142 at about 50 psi. In order to properly control the diaphragm pump 100 the hydraulic oil line 126 needs to be about 10 psi higher than the feed pressure, so in this case 60 psi. The 50 psi from line 142 is directed to the top side of the regulator diaphragm 38 through port 28. The spring 50 also applies an additional force equivalent to 10 psi to the top of the diaphragm 38. When the hydraulic pump 124 is started pressure will build in line 126 and in the regulator main passages connected to passages 32 and also to the bottom side of the diaphragm 38. Once the pressure has reached 60 psi the diaphragm will move upward causing the rod 36 to open slots 34 which releases fluid to the reservoir 146 which is at atmospheric pressure. Increase in pressure will dump more fluid until an equilibrium near 60 psi is reached. If the demand for hydraulic fluid increases, the pressure will drop, and the valve will close until the controlled fluid reaches 60 psi again.

At normal full pressure operation, a typical oil demand to the diaphragm pump 100 may be about 1.5 gpm. Under these conditions, the remaining 1.5 gpm is bypassed back to the oil reservoir 146 through port 3. The valve moves the rod 36 so that about 10 psi is maintained in the controlled flow in line 126. Ideally this would be about mid stroke of the rod and diaphragm assembly.

To establish the pressure range in which the valve 20 operates, the spring 50 must be matched with the diaphragm 38 to produce the desired pressure at a given valve opening. Using the example system where the desired pressure range is 5 to 15 psi, the following could be used. A diaphragm is chosen with the ability to cover the stroke of the rod 36. A typical stroke is about 0.75 inch. A typical diaphragm 38 with this stroke would have an equivalent area of about 4.9 square inches (that is the area equivalent to a 2.5 inch diameter piston). The spring 50 has a constant matches compression of the spring 50 by movement of the rod 36 over a full flow range with allowable pressure. The rod 36 will move about 0.625 inches from the cracking pressure of 5 psi to the full open pressure of 15 psi. With the equivalent area of 4.9 square inches that translates to a required spring force of F=P*A so 24.5 lbs. at cracking and 73.5 lbs. at fully open. The change in force divided by change in spring length is 49 lbs. divided by 0.625 giving a spring constant of 78.4 lbs. per inch.

A conventional application for the regulator valve 20 is for pumping slurries, which feed the large diaphragm pump 100 having a high content of solids. This fluid having high solids content would be directed to port 48 of the regulator valve 20. This type of fluid tends to precipitate the solids in stagnant areas and form a solid mass. When this mass opposes the movement of a component in a pump it is often called packing out. To avoid this from happening in a valve or pressure gauge an isolation fluid is sometimes used. This is a zone in the connection between the inlet slurry and the valve 20 that is filled with a fluid like oil. The oil is separated from the slurry with a diaphragm or piston. This is a complicated arrangement that requires significant effort to fill and maintain. There is therefore a benefit if the valve does not require isolation from the slurry. In the regulator valve 20 of the present invention, the connection port at the end of the spring 50 is much larger than what is needed for simply transmitting the pressure signal. When the regulator valve 20 is used with a slurry connected to the sensing port 48, the regulator valve 20 can be oriented with the sensing port 48 facing downward. This configuration allows the solids to settle outside of the valve housing, and further, when the valve 20 cycles to full open, it tends to flush solids out of the spring area.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A regulator valve comprising:
a valve body defining a central bore with a longitudinal axis;
a diaphragm;
a rod coupled to the diaphragm and sliding along the longitudinal axis within the central bore, the rod having a planar end transverse to the longitudinal axis;
a spring mounted in the central bore and directly engaging the rod;
one or more parallel passages formed in the valve body extending parallel to the bore; and
one or more slots, each of the one or more slots connecting one of the one or more parallel passages to the central bore;
wherein each of the one or more slots has a cross-sectional area smaller than a cross-sectional area of each of the one or more connected parallel passages to form a connecting neck between the central bore and one of the connected parallel passages.

2. The regulator valve according to claim 1, wherein the valve body comprises a shoulder engaged by an end of the spring.

3. The regulator valve according to claim 1, wherein the spring comprises a helical spring and the valve body comprises a shoulder engaged by an end of the helical spring.

4. The regulator valve according to claim 1, wherein one or more of the slots is tapered.

5. The regulator valve according to claim 1, wherein the one or more slots comprise a plurality of slots of different lengths.

6. The regulator valve according to claim 1, each of the slots having a cross sectional area smaller than a cross-sectional area of a connected parallel passage.

7. The regulator valve according to claim 1, each of the slots having a width smaller than a width of a connected parallel passage.

8. The regulator valve according to claim 1, wherein the valve body comprises a supporting surface for engaging the diaphragm.

9. The regulator valve according to claim 1, wherein the diaphragm is clamped in place by an upper housing.

10. A regulator valve comprising:
a valve body defining a central bore with a longitudinal axis;
a diaphragm;
a rod coupled to the diaphragm and sliding along the longitudinal axis within the central bore, the rod having a planar end;
a spring mounted in the central bore and engaging the rod;
a plurality of parallel passages formed in the valve body extending parallel to the bore; and
a plurality of slots, each of the plurality of slots connecting one of the plurality of parallel passages to the central bore:

wherein each of the plurality of slots has a cross-sectional area smaller than a cross-sectional area of each of the connected parallel passages to form a connecting neck between the central bore and one of the connected parallel passages.

11. The regulator valve according to claim 10, wherein one or more of the plurality of slots is tapered.

12. The regulator valve according to claim 10, wherein the plurality of slots comprise slots having a plurality of different lengths.

13. A diaphragm pump system comprising:
a diaphragm pump having a transfer chamber containing hydraulic fluid;
a first valve allowing hydraulic fluid into the transfer chamber;
a second valve allowing hydraulic fluid to be removed from the transfer chamber;
a hydraulic fluid reservoir in fluid communication with the transfer chamber;
wherein a hydraulic fluid pressure is above a pumped fluid inlet feed pressure;
a pressure bypass regulator valve bypassing fluid flow to the transfer chamber, the regulator valve comprising:
a valve body defining a central bore with a longitudinal axis;
a diaphragm;
a rod coupled to the diaphragm and sliding along the longitudinal axis within the central bore, the rod having a planar end;
a spring mounted in the central bore and engaging the rod;
a plurality of parallel passages formed in the valve body extending parallel to the bore; and
a plurality of slots, each of the plurality of slots connecting one of the plurality of parallel passages to the central bore;
wherein each of the plurality of slots has a cross-sectional area smaller than a cross-sectional area of each of the connected parallel passages to form a connecting neck between the central bore and one of the connected parallel passages.

14. The diaphragm pump system according to claim 13, wherein the valve body comprises a shoulder engaged by an end of the spring.

15. The diaphragm pump system according to claim 13, wherein the spring comprises a helical spring and the valve body comprises a shoulder engaged by an end of the helical spring.

16. The diaphragm pump system according to claim 13, wherein one or more of the slots is tapered.

17. The diaphragm pump system according to claim 13, wherein the one or more slots comprise a plurality of slots of different lengths.

* * * * *